J. L. BECK.
APPARATUS FOR CONTROLLING LIGHTS ON AUTOMOBILES.
APPLICATION FILED FEB. 18, 1911.
1,018,154.
Patented Feb. 20, 1912.
3 SHEETS—SHEET 1.
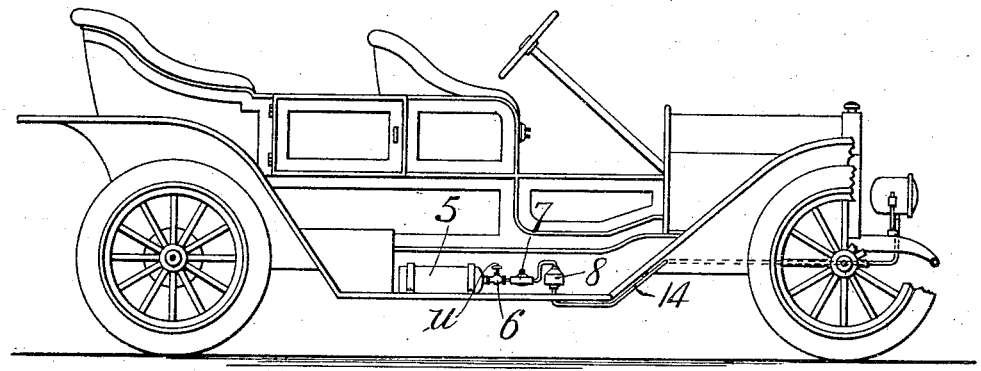
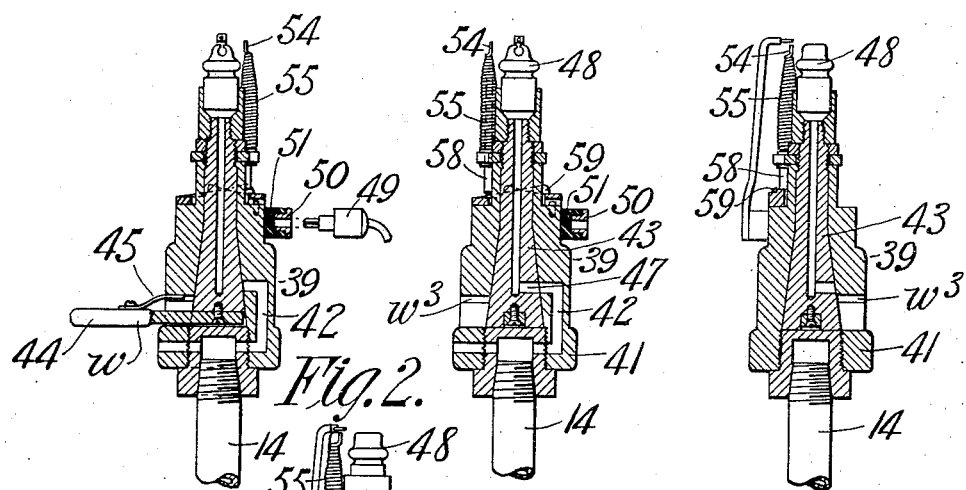
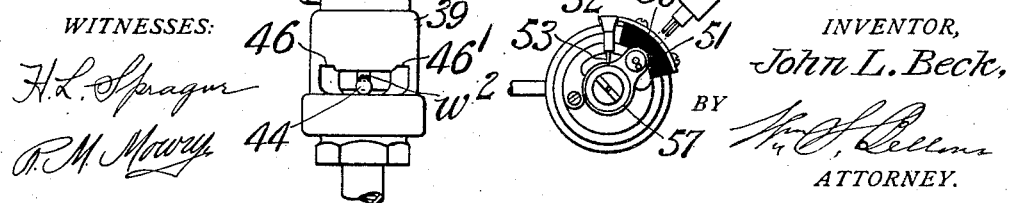
WITNESSES:
INVENTOR,
John L. Beck,
BY
ATTORNEY.

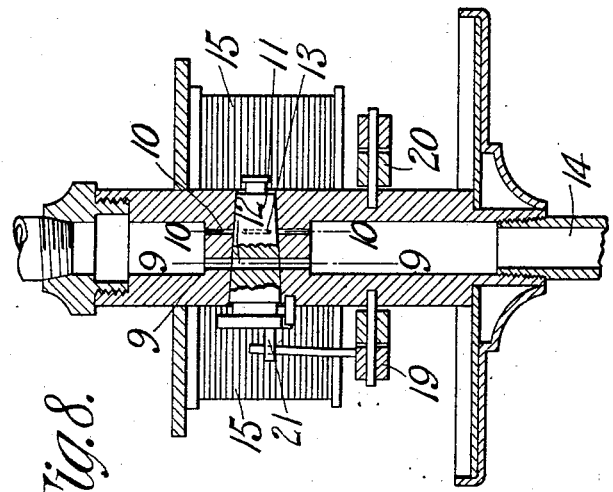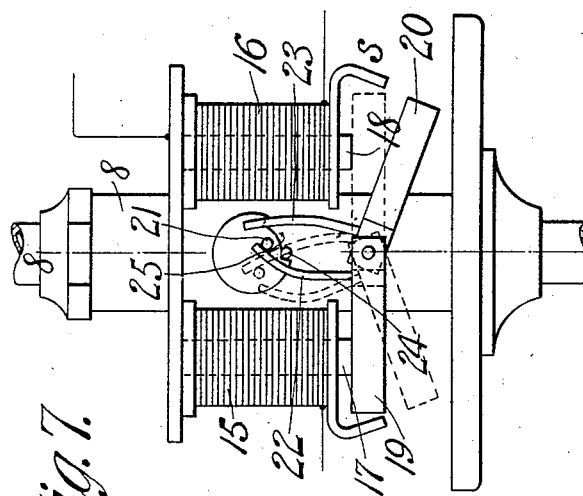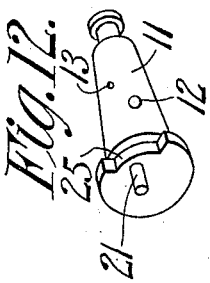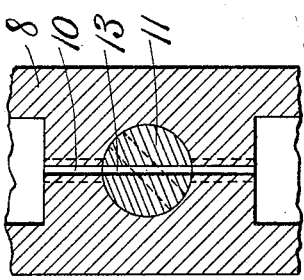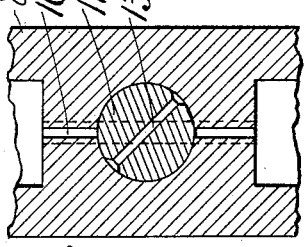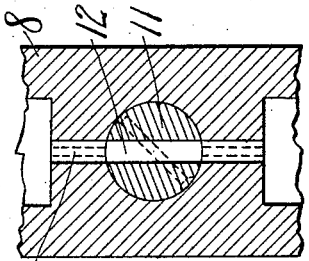

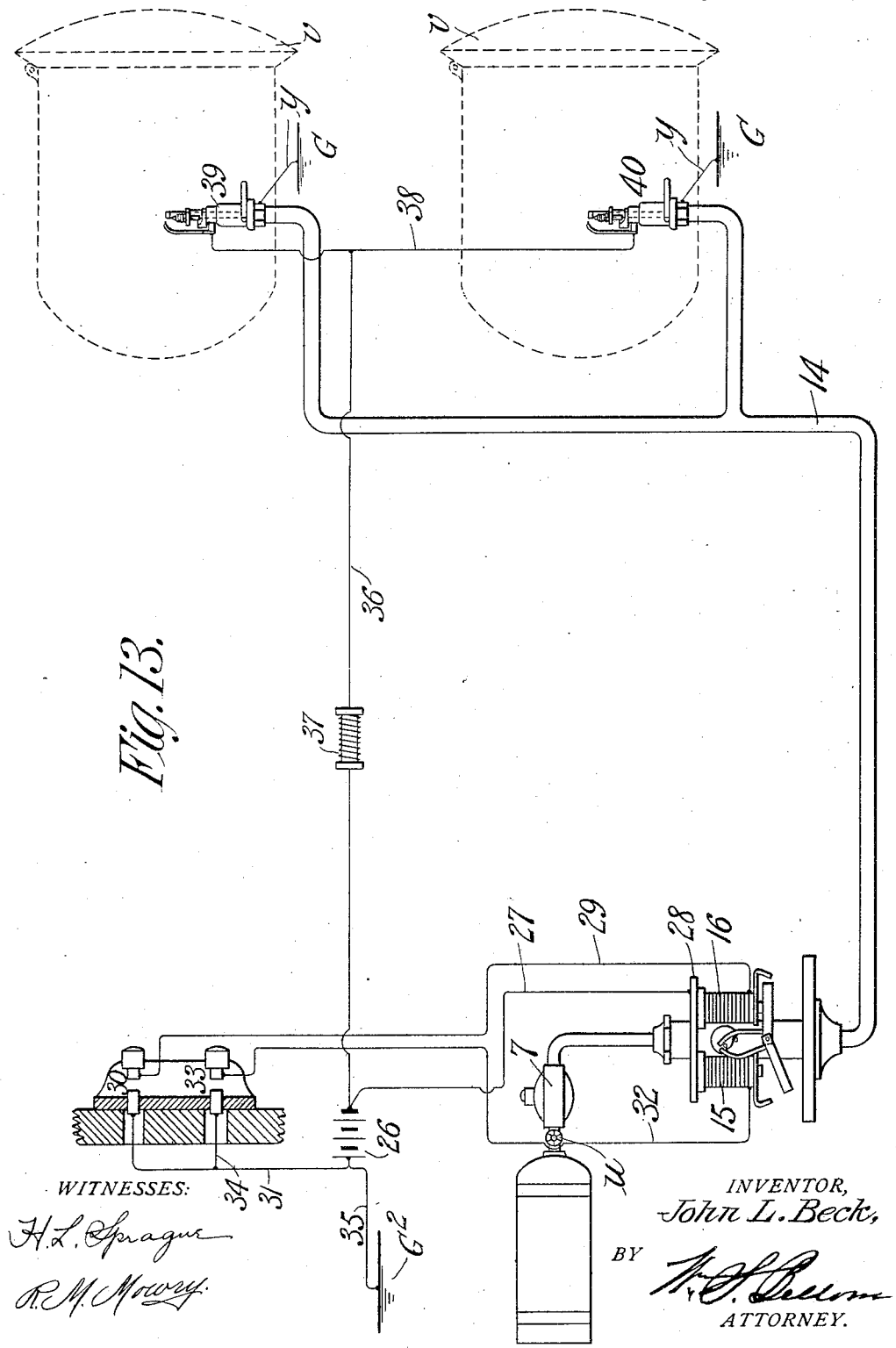

UNITED STATES PATENT OFFICE.

JOHN L. BECK, OF SPRINGFIELD, MASSACHUSETTS.

APPARATUS FOR CONTROLLING LIGHTS ON AUTOMOBILES.

1,018,154. Specification of Letters Patent. Patented Feb. 20, 1912.

Application filed February 18, 1911. Serial No. 609,281.

*To all whom it may concern:*

Be it known that I, JOHN L. BECK, a citizen of the United States of America, and resident of Springfield, in the county of Hampden and State of Massachusetts, have invented certain new and useful Improvements in Apparatuses for Controlling Lights on Automobiles, of which the following is a full, clear, and exact description.

This invention relates to gas lighting and controlling apparatus particularly intended for use upon automobiles, one object of the invention being to provide a structure of such nature that the driver of the automobile may brighten or dim the lamps from the seat of the automobile. This is highly desirable for the reason that the searchlights commonly employed upon vehicles of this character are so dazzling as to "blind" pedestrians and horses if turned on to their full capacity. For that reason it is desired, when passing through towns or villages, to dim the lamps.

A further object of the invention is the provision of a structure of the character set forth having a gas controlling valve located at the burners of the lamps and inside of said lamps so that it is necessary for the operator, when first lighting the lamps, to open the lamp doors.

It has been found that where electric igniting apparatus is employed and an attempt is made to light the lamps, with the doors closed sufficient gas sometimes accumulates inside the lamps before it ignites to cause an explosion of such violence as to blow the fronts out of the lamps. It is to obviate this that the present invention is designed and this is accomplished by rendering it necessary to open the doors of the lamps before the gas can reach the burners.

Further objects and advantages of the invention will be set forth in the detailed description which now follows:

In the accompanying drawing, Figure 1 is a side elevation of an automobile having the invention applied thereto, Fig. 2 is a side elevation of a gas burner comprising electrical igniting elements of a known kind and now in commercial use, Figs. 3, 4, and 5 are sectional views of said burner, Fig. 6 is a plan view thereof, Figs. 7 and 8 are respectively side and sectional views of the controller for brightening or dimming the lamps, the sectional view, Fig. 8, being taken on line 8—8 of Fig. 7, Fig. 9 is a sectional view through the controlling valve shown in Fig. 8, said view being taken on line 9—9 of Fig. 8. Fig. 10 is a sectional view upon line 10—10 of Fig. 8, Fig. 11 is a view like Fig. 10 but with the valve plug turned to a different position, Fig. 12 is a detail perspective view of the valve plug, and Fig. 13 is a diagrammatic view of the entire system.

Like numerals designate corresponding parts in all of the figures of the drawing.

Referring to the drawing, the numeral 5 designates the usual gas tank of the automobile in which gas is stored under pressure. A manually operable controlling valve 6 is located in the gas line leading from said tank as is also a pressure reducing valve 7. The gas line leads from the pressure reducing valve to a valve casing 8 (see Figs. 7 to 11). This valve casing has two ports formed therethrough, one a port 9 of comparatively large capacity and the other a port 10 of much smaller capacity. A valve plug 11 has ports 12 and 13 formed therethrough, the port 12 corresponding in capacity with port 9 and the port 13 corresponding in capacity with the port 10. It will be understood, however, that when the port 12 is in alinement with the port 9, the port 13 is out of alinement with the port 10 and vice versa. The gas line is continued at 14 to the lamps of the automobile. Arranged adjacent the valve casing 8 are two pairs of magnets 15 and 16, the cores 17 and 18 of which serve to attract armature bars 19 and 20.

The valve plug 11 is provided with a pin 21 which extends outwardly from the head end of said plug into the path of movement of fingers 22 and 23 carried by and movable with the armature bars 19 and 20. It will be readily understood therefore, that when one pair of magnets is energized to attract one of the armature bars, the valve plug will be moved to the position to bring the port 12 into alinement with the port 9 and when the other bar of said magnets is energized to attract the armature bar 20, said valve plug is moved to bring the port 13 into alinement with the port 10. A stop pin 24 is carried by the valve casing 8 and the head end of the valve plug has a cut-away portion 25 for the reception of said pin, said pin serving to limit the movement of the valve plug in both directions.

The battery or other source of electrical energy indicated at 26 serves not only to actuate the plug 11, but also serves to ignite the lamps as will be hereinafter described. The circuits for the magnets illustrated in Figs. 7, 8 and 13 are illustrated in Fig. 13. These circuits comprise a conductor 27 leading from the battery 26 to a back plate 28 that is in electrical communication with the windings of all of the magnets. The circuit through magnets 16 comprises a conductor 29, push button 30 and conductor 31. The circuit through magnets 15 comprises a conductor 32, push button 33 and conductor 34. The battery is grounded at 35 upon the frame of the automobile with which pipe 14 is in electrical communication. A conductor 36 leads from the battery through a spark coil 37 to a conductor 38 and thence to the lamp burners 39 and 40.

The burner 39 has been illustrated in side elevation, in section and in plan, in Figs. 2 to 6, inclusive, and by referring to these figures, it will be seen that said burner comprises a casing 41 having a port 42 formed therein which is in communication with pipe 14. A valve plug 43 is provided with an operating handle 44 and this operating handle is in turn provided with a detent spring 45 adapted to engage at the limits of movement of said handle in notches 46, 46' to thereby lock the valve plug in either its opened or closed position. When in its opened position, a port 47 of valve plug 43 comes into communication with port 42 of casing 41, said port 47 conducting gas to the burner tip 48. The terminals of conductor 38 are provided with plugs 49 plugged into receptacles 50 which are insulated from the valve casing by blocks of insulating material 51. The receptacles 50 are of metal and are provided with arms 52, said arms being in turn provided with spark points 53. A second spark point 54 is formed upon a spring contact member 55, said contact member being in turn mounted in an extension 56 of a sleeve 57, this sleeve turning bodily with the valve plug 43 when said plug is partially rotated by the movement of the handle 44. During the bodily movement of spring 55, the lower end of a rod 58 contacts with cam surface 59 of burner 39 and since during the rotation of the valve plug, the point 34 is brought across the point 53, it follows that an electric spark spans the gap between these two points and ignites the gas that issues from the tip 48 after the port 47 is brought into alinement with port 42. When the rod 58 rides over the cam surface 59 it elongates the spring and causes the point 54 to wipe across the point 53. As before stated, however, this burner is already commercially known and it is pertinent to this application only in the fact that it provides in its construction local means within the lamps for controlling both the gas and ignition apparatus.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. In a lighting system for automobiles, the combination with a gas supply tank, a burner within a lamp of the automobile, a pipe leading from said tank to said burner, a valve located in said pipe and comprising a plug having a port of large capacity and a port of smaller capacity therethrough, and electrical means controllable from the seat of the automobile for moving said plug to bring either of said ports into communication with said pipe at will.

2. In a lighting system for automobiles, the combination with a gas supply tank, a burner within a lamp of the automobile, a pipe leading from said tank to said burner, a valve located in said pipe and comprising a plug having a port of large capacity and a port of smaller capacity therethrough, electrical means controllable from the seat of the automobile for moving said plug to bring either of said ports into communication with said pipe at will, and a locally positioned valve at the burner for controlling the passage of gas therethrough.

3. In a lighting system for automobiles, the combination with a gas supply tank, a burner within a lamp of the automobile, a pipe leading from said tank to said burner, a valve located in said pipe and comprising a plug having a port of large capacity and a port of smaller capacity therethrough, electrical means controllable from the seat of the automobile for moving said plug to bring either of said ports into communication with said pipe at will, a locally positioned valve at the burner for controlling the passage of gas therethrough, electrical ignition means, and locally positioned controlling means for said electric ignition means at said burner.

Signed by me at Springfield, Mass., in presence of two subscribing witnesses.

JOHN L. BECK.

Witnesses:
WILBUR A. STANNARD,
WM. S. BELLOWS.

Copies of this patent may be obtained for five cents each, by addressing the "Commissioner of Patents, Washington, D. C."